(12) United States Patent
Gerber

(10) Patent No.: US 6,647,714 B1
(45) Date of Patent: Nov. 18, 2003

(54) EXHAUST HEADER SYSTEM

(75) Inventor: Brian H. Gerber, Scottsdale, AZ (US)

(73) Assignee: GHL Motorsports, L.L.C., Mesa, AZ (US)

( * ) Notice: Subject to any disclaimer, the term of this patent is extended or adjusted under 35 U.S.C. 154(b) by 0 days.

(21) Appl. No.: 10/159,357

(22) Filed: May 29, 2002

(51) Int. Cl.[7] .............................................. F02B 27/02
(52) U.S. Cl. ........................... 60/313; 60/320; 60/324; 60/323
(58) Field of Search ................................. 320/320, 321, 320/322, 323, 324, 313, 312

(56) References Cited

U.S. PATENT DOCUMENTS

| | | | | |
|---|---|---|---|---|
| 4,187,677 A | * | 2/1980 | Sakurai ........................ | 60/282 |
| 4,329,843 A | * | 5/1982 | Inoue et al. .................. | 60/274 |
| 5,784,882 A | * | 7/1998 | Bonny et al. ................. | 60/323 |
| 5,862,662 A | * | 1/1999 | Fukuda et al. ............... | 60/313 |
| 5,934,070 A | * | 8/1999 | Lagelstorfer ................. | 60/280 |
| 6,209,319 B1 | * | 4/2001 | Maeda et al. ................ | 60/323 |
| 6,374,599 B1 | * | 4/2002 | Thomas ....................... | 60/312 |

FOREIGN PATENT DOCUMENTS

JP 2000-110555 * 4/2000

* cited by examiner

Primary Examiner—Thomas Denion
Assistant Examiner—Diem Tran
(74) Attorney, Agent, or Firm—Jordan M. Meschkow; Lowell W. Gresham; Meschkow & Gresham, PLC

(57) ABSTRACT

An exhaust header system (20) for an internal combustion engine includes primary tubes (22), each having inlet (26) and outlet (28) ends. The inlet ends (26) are adapted to carry exhaust gas (60) from exhaust ports of the internal combustion engine. A collector (24) has a collector inlet (32), a collector outlet (34), and an intermediate section (36) interposed between the collector inlet (32) and the collector outlet (34). The collector inlet (32) exhibits an ovular cross-section, and the outlet ends (28) of the primary tubes (22) are aligned along a width (74) of the collector inlet (32). The collector outlet (34) exhibits a circular cross-section, and the intermediate section (36) transitions from the ovular cross-section at the collector inlet (32) to the circular cross-section at the collector outlet (34). The exhaust gas (60) is received at the collector inlet (32), and a uniform, non-turbulent flow of exhaust gas (60) is produced which flows from the collector outlet (34) into a catalytic converter (38).

20 Claims, 3 Drawing Sheets

EXHAUST HEADER SYSTEM

TECHNICAL FIELD OF THE INVENTION

The present invention relates generally to the field of exhaust headers. More specifically, the present invention relates to an exhaust header system for interconnection with a catalytic converter and accompanied by enhanced engine performance.

BACKGROUND OF THE INVENTION

Automotive internal combustion engines utilize exhaust systems for directing burnt gases out of the engine cylinders and for dampening exhaust noises. Factory-installed exhaust systems typically include an exhaust manifold, a catalytic converter coupled to an outlet of the exhaust manifold, an exhaust pipe extending from the catalytic converter to the rear of the vehicle, a muffler coupled to the end of the exhaust pipe, and a tailpipe extending from the muffler to outside the vehicle. Exhaust manifolds formed of thick cast iron and high-restriction mufflers are installed at the factory to achieve substantial sound dampening. A problem encountered with these manifolds and mufflers is that they severely impair the flow of exhaust gases, which greatly reduces the power output of the engine. In addition, the weighty cast iron material further decreases performance and increases gas consumption.

To increase engine efficiency and performance, the exhaust system can be replaced with commercially available low-restriction manifolds and mufflers that more effectively exhaust burnt gases without significantly increasing the exhaust noise. Low-restriction manifolds, typically referred to as "headers", can have equal or unequal length, lightweight, large diameter tubes tuned to a predetermined resonant frequency that scavenge the burnt gases from the engine with a high amount of efficiency.

In general, a header includes a flange plate that bolts up to the exhaust ports of an internal combustion engine, primary tubes that extend from holes in the flange plate at the exhaust port locations, and a collector tube at which the primary tubes are brought together. The collector tube receives the exhaust gas from the primary tubes and directs it toward the exhaust pipe.

A variety of header designs have been developed. A common design is one in which four primary tubes extend from the flange and are brought together in an approximately square configuration at a collector tube. Alternatively, three primary tubes may be brought together in an approximately triangular configuration at the collector tube. The total cross-sectional area of the primary tubes is collected and reduced to the cross-section of the exhaust pipe. In other designs, pairs of primary pipes are brought together, then the combined primaries are brought together in a collector tube. In racecars, the primary tubes extending from the flanges may be brought outside the vehicle independently, functioning as individual exhaust pipes. Yet in other designs, primary tubes from opposite banks of a V-8 or V-6 engine may be brought together in a selected configuration.

Uniform flow and avoidance of turbulence in the primary tube, collector, and exhaust system are important in reducing back pressure and maximizing both power and fuel efficiency. The point where the primary tubes come together and enter the collector has been found to be a problem area in assuring smooth, non-turbulent exhaust gas flow through the collector. The cross-sectional area of the combined primary tube outlet ends transitions through the collector to the (generally smaller) exhaust pipe cross-section. The cross-sectional area that is formed between the bundled primary pipe ends, for example, the approximately square configuration of four primary pipes and the approximately triangular configuration of three primary pipes, is a major cause of turbulence.

Attempts have been made to smooth this transition by cutting back the adjacent surfaces of adjacent primary pipes, then welding them together to substantially eliminate the area between the pipe ends. This is difficult, expensive in design and manufacture, and with a number of complex welds may actually add to turbulence in this transition region. Another attempt at smoothing this transition is the inclusion of a transition piece within the collector that attempts to guide the exhaust gas so as to provide a smooth transition from the greater combined internal cross-section of the primary pipe ends to the lesser cross-section of the collector pipe end. Unfortunately, the inclusion of such a transition piece results in undesirable design and manufacturing complexity, hence undesirably high cost.

In addition to reducing back pressure and maximizing both power and fuel efficiency, uniform flow and avoidance of turbulence is also important for enhancing the life span of the pollution-controlling catalytic converter. That is, a turbulent flow of exhaust gas through the catalytic converter can result in the formation of local hot spots, which degrades the catalyst within the converter and consequently severely reduces the life expectancy of the catalytic converter.

Thus, what is needed is a header system that produces a uniform flow of exhaust gas from the primary tubes to the collector, thereby reducing back pressure, maximizing power and fuel efficiency, and extending the life span of the catalytic converter.

SUMMARY OF THE INVENTION

Accordingly, it is an advantage of the present invention that an exhaust header system for an internal combustion engine is provided.

It is another advantage of the present invention that a header system is provided that produces a uniform flow of exhaust gas from the primary tubes to reduce back pressure, and maximize horsepower and fuel efficiency.

Another advantage of the present invention is that a header system is provided that produces a uniform flow of exhaust gas that effectively extends the life span of the catalytic converter.

Yet another advantage of the present invention is that a header system is provided that is cost effective to manufacture and install.

The above and other advantages of the present invention are carried out in one form by an exhaust header system for an internal combustion engine. The exhaust header system includes primary tubes, each having inlet and outlet ends. The inlet ends are adapted to carry exhaust gas from exhaust ports of the internal combustion engine. A collector has a collector inlet for receiving the exhaust gas from the primary tubes and a collector outlet, the outlet ends of the primary tubes converging at the collector inlet. The collector inlet exhibits an ovular cross-section, and the collector outlet exhibits a circular cross-section.

The above and other advantages of the present invention are carried out in another form by an exhaust header system for an internal combustion engine. The exhaust header system includes primary tubes, each having inlet and outlet ends. The inlet ends are adapted to carry exhaust gas from exhaust ports of the internal combustion engine. A collector includes a collector inlet for receiving the exhaust gas from the primary tubes and a collector outlet. The collector inlet exhibits an ovular cross-section defined by a width and a height, the width being greater than the height. The outlet ends of the primary tubes are aligned along the width. The collector further includes a collector outlet exhibiting a circular cross-section, and an intermediate section juxtaposed between the collector inlet and the collector outlet. The intermediate section carries the exhaust gas from the collector inlet to the collector outlet, and exhibits a cross-section that transitions from the ovular cross-section to the circular cross-section proximate the collector outlet.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
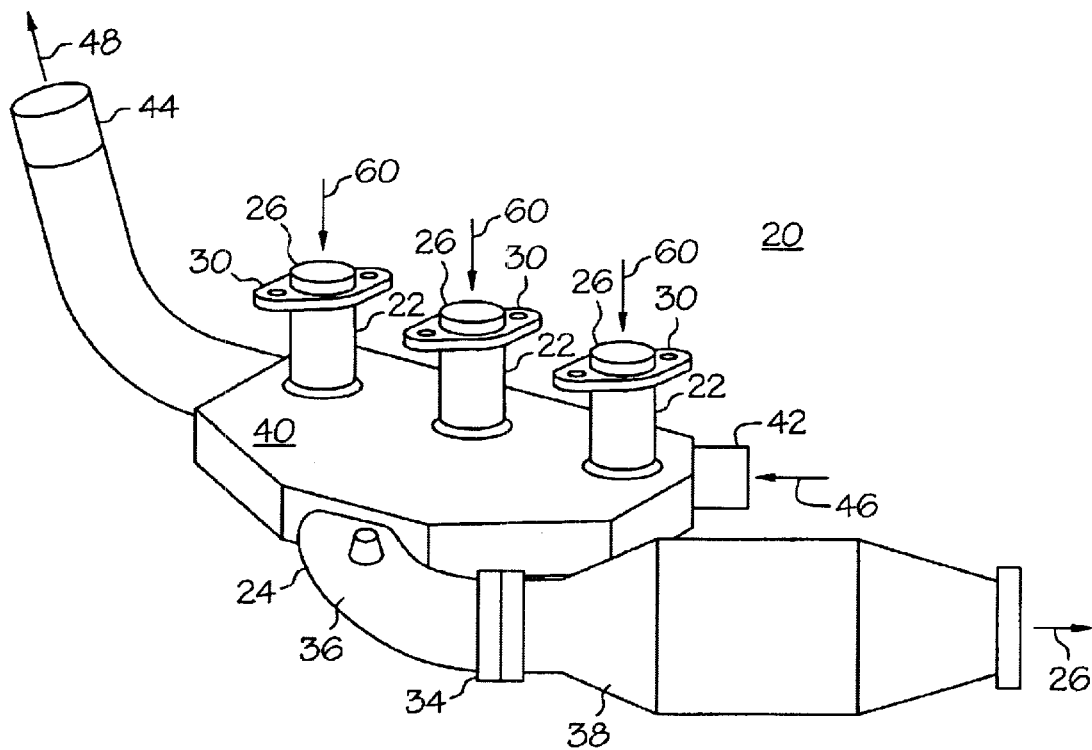
FIG. 1 shows a perspective view of an exhaust header system in accordance with a preferred embodiment of the present invention.
Figure 2:
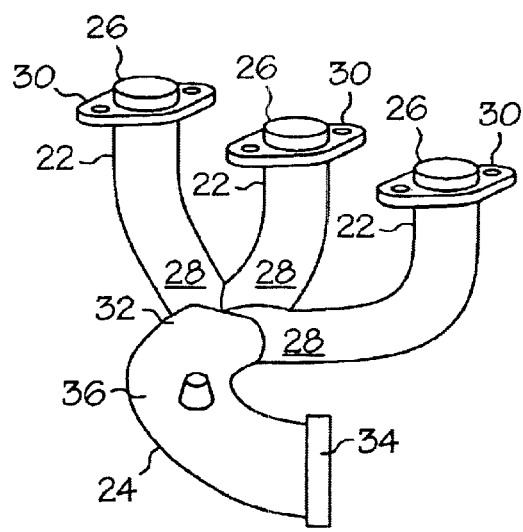
FIG. 2 shows a perspective view of primary tubes and a collector of the exhaust header system.

Referring to FIGS. 1–2, FIG. 1 shows a perspective view of an exhaust header system 20 in accordance with a preferred embodiment of the present invention. FIG. 2 shows a perspective view of primary tubes 22 and a collector 24 of exhaust header system 20. Exhaust header system 20 is configured for use with an internal combustion engine (not shown). In particular, the internal combustion engine may be a high performance engine normally used in sports cars, such as a Porsche.

Although exhaust header system 20 is described as being used with an internal combustion engine of a sports car, it should be understood that exhaust header system 20 may be adapted for use with a variety of vehicles, such as a conventional automobile, truck, van, motorcycle, speed boat, and the like. Moreover, exhaust header system 20 may be provided as original equipment on a new sports car or, alternatively, may be provided by an after-market header manufacturer.

Each of primary tubes 22 includes an inlet end 26 and an outlet end 28. Inlet end 26 includes flanges 30 that bolt up to the exhaust ports (not shown) of an internal combustion engine. Collector 24 includes a collector inlet 32, a collector outlet 34, and an intermediate section 36 juxtaposed between collector inlet 32 and collector outlet 34. Outlet ends 28 of primary tubes 22 converge at and are coupled, via welds, to collector inlet 32 of collector 24. A catalytic converter 38 is coupled to collector outlet 34 of collector 24.

A heater box 40 encloses primary tubes 22 and collector inlet 32 of collector 24. Heater box 40 includes an air inlet 42 and an air outlet 44. Cool air, represented by an arrow 46, is drawn into heater box 40 via air inlet 42, and heat radiated from primary tubes 22 warms cool air 46 to form warm air, which is released from air outlet, as represented by an arrow 48. Warm air 4.8 from heater box 40 is used by the heating and defrosting system for the vehicle in which the internal combustion engine resides. It should be apparent to those skilled in the art that exhaust header system 20 need not be provided with heater box 40 for vehicles whose heat and defrost systems do not utilize the warm air radiated from the header, or exhaust manifold.

In a preferred embodiment of the present invention, primary tubes 22 form a shortened header, known as a "shorty header". A shorty header has primary tubes that are approximately one third the length of the primary tubes of a conventional header. That is, the tube length of primary tubes 22 is in the range of eight to twelve inches, rather than the typical thirty-six inches found on conventional long tube headers.

A shorty header provides increased horsepower, but contains greater turbulence of exhaust gas in the collector region, as compared to conventional long tube headers. The increased exhaust gas turbulence arises because the shorty header does not have the longer directional air flow passage found in the conventional long tube headers. In addition, there is less distance and opportunity for air cooling. As such, the exhaust gas is hotter in a shorty header, and therefore more turbulent, than the exhaust gas in a conventional long tube header. The present invention remedies the problem of turbulent exhaust gas flow in a shorty header through the utilization of a specialized primary tube and collector configuration.

In addition, exhaust header system 20, configured as a commercially available shorty header, is a direct bolt on replacement for an original equipment manufacturer (OEM) exhaust manifold. In particular, installation of exhaust header system 20 does not necessitate the change out of the factory provided oil lines, thereby resulting in an easier, less time consuming, and less costly installation as compared to conventional header systems that require the replacement of two oil lines.

Figure 3:
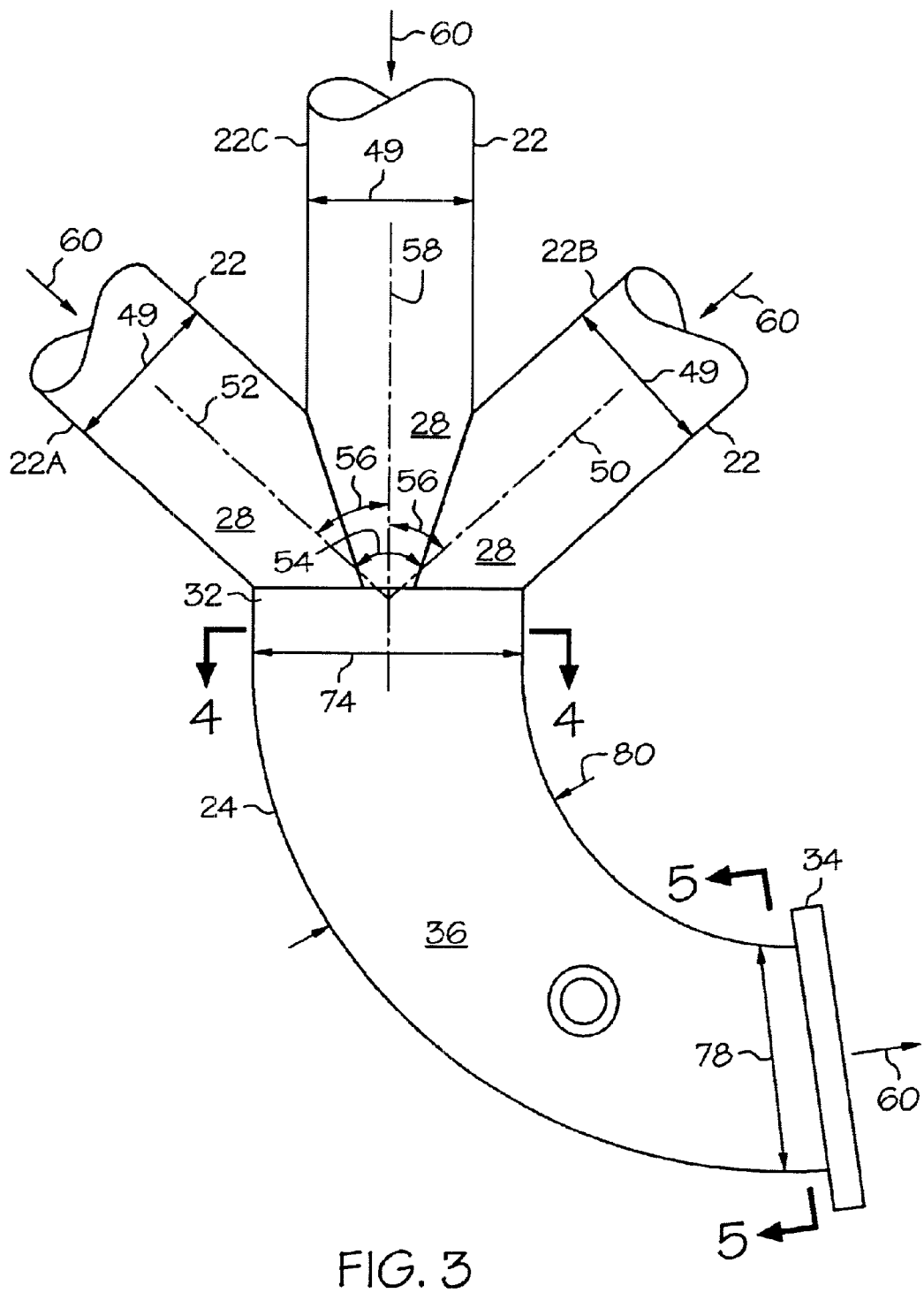
FIG. 3 shows a top view of a portion of the primary tubes and collector of the exhaust system of FIG. 1.

FIG. 3 shows a top view of a portion of primary tubes 22 and collector 24 of exhaust header system 20 (FIG. 1). Primary tubes 22 include a first primary tube 22A, a second primary tube 22B, and a third primary tube 22C, each of which exhibit a diameter 49. A centerline 50 of second primary tube 22B is oriented substantially perpendicular to a centerline 52 of first primary tube 22A, thus forming an approximate right angle 54 therebetween.

Third primary tube 22C is disposed between first and second primary tubes 22A and 22B, respectively. Third primary tube 22C subdivides right angle 54 into a pair of substantially equivalent acute angles 56. Third primary tube 22C is aligned with collector 24 at collector inlet 32 along a common axis 58. Thus arranged, centerline 50 of second primary tube 22B and centerline 52 of first primary tube 22A intersect at common axis 58.

Referring to FIGS. 1 and 3, in operation, inlet ends 26 of primary tubes 22 are adapted to carry exhaust gas, represented by arrows 60, from an engine cylinder (not shown) of an internal combustion engine (not shown). Exhaust gas 60 flows through primary tubes 22 and exits from outlet ends 28. Exhaust gas 60 then enters collector 24 at collector inlet 32, flows through intermediate section 36, and is exhausted from collector outlet 34. From collector outlet 34, exhaust gas 60 travels through catalytic converter 38 where unburned hydrocarbons and carbon monoxide in exhaust gas 60 are converted into less harmful compounds. Exhaust gas 60 subsequently exits catalytic converter 38 and flows through downstream elements of the exhaust system, i.e., exhaust pipe, muffler, and tail pipe (not shown).

Exhaust header system 20 is configured as a dual header/ catalytic converter system for use with a six cylinder internal combustion engine. A six cylinder internal combustion engine includes a total of six exhaust ports (not shown). Accordingly, first, second, and third primary tubes 22A, 22B, 22C are adapted to carry exhaust gas 60 from a first set of three exhaust ports of the internal combustion engine. Exhaust header system further includes second primary tubes and a second collector, the second primary tubes being adapted to carry exhaust gas 60 from a second set of three exhaust ports of the internal combustion engine. The second primary tubes and second collector are configured similarly to primary tubes 22 and collector 24. As such, the teachings of primary tubes 22 and collector 24 apply equally to the second primary tubes and second collector.

In a preferred embodiment, a second catalytic converter (not shown) is coupled to a collector outlet of the second collector. A dual catalytic converter system reduces back pressure, thereby enhancing engine performance, by enabling each catalytic converter to flow half of exhaust gas 60 as opposed to all six cylinders of exhaust gas 60 flowing through a single catalytic converter.

Figure 4:
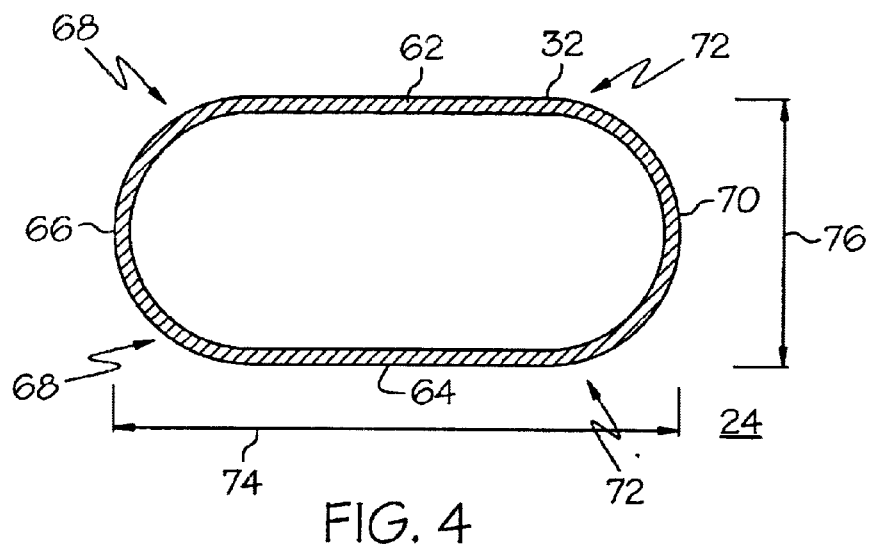
FIG. 4 shows a cross-sectional view of a collector inlet along lines 4—4 of the collector of FIG. 3.

FIG. 4 shows a cross-sectional view of collector inlet 32 along lines 4—4 of collector 24 shown in FIG. 3. Collector inlet 32 exhibits an ovular cross-section. More specifically, collector inlet 32 includes a first flat wall 62, and a second flat wall 64 in opposing relationship with first flat wall 62. A first arcuate wall 66 is coupled to first ends 68 of each of first and second flat walls 62 and 64, respectively. Similarly, a second arcuate wall 70 is coupled to second ends 72 of each of first and second flat walls 62 and 64.

First and second flat walls 62 and 64, respectively, are longer than first and second arcuate walls 66 and 70, respectively, to establish a width 74 of collector inlet 32 that is greater than a height 76 of collector inlet 32. Height 76 of collector inlet 32 is substantially equivalent to diameter 49 (FIG. 3) of primary tubes 22. Width 74 of collector inlet 32 enables outlet ends 28 of primary tubes 22 to be substantially aligned at the juncture of primary tubes 22 with collector inlet 32, as best seen in FIG. 3.

Figure 5:
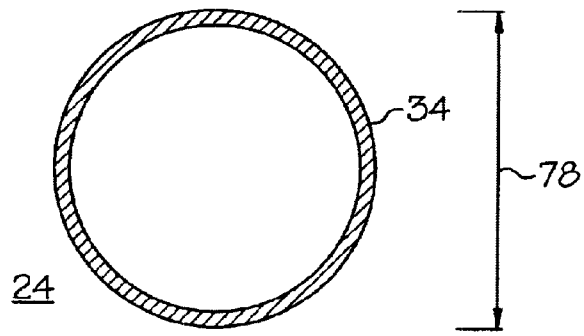
FIG. 5 shows a cross-sectional view of a collector outlet along lines 5—5 of the collector of FIG. 2.

FIG. 5 shows a cross-sectional view of collector outlet 34 along lines 5—5 of collector 24 shown in FIG. 3. Collector outlet 34 exhibits a circular cross-section having a diameter 78. Diameter 78 is less than width 74 of collector inlet 32. However, diameter 78 is greater than height 76 of collector inlet 32.

Referring collectively to FIGS. 3–5, a section width 80 of intermediate section varies from width 74 to diameter 78. More specifically, section width 80 of intermediate section 36 uniformly tapers from width 74 at collector inlet 32 to a second width, i.e., diameter 78, at collector outlet 34.

Figure 6:
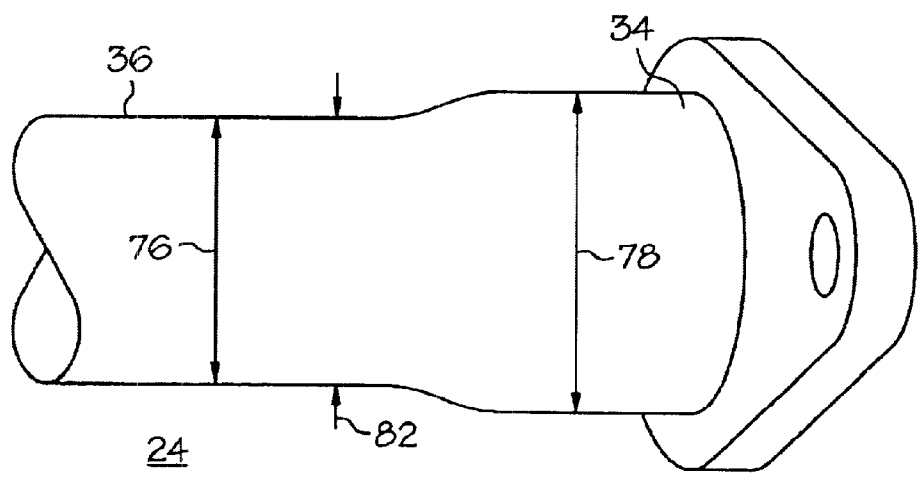
FIG. 6 shows a side perspective view of the collector of the exhaust header system of FIG. 1.

FIG. 6 shows a side perspective view of a portion of collector 24. In particular, the side perspective view of collector 24 shows a portion of intermediate section 36 adjoining collector outlet 34. Intermediate section 36 exhibits a section height 82 that is substantially equivalent to height 76 at collector inlet 32 (FIG. 4). However, section height 82 transitions from height 76 to diameter 78 proximate collector outlet 34. Accordingly, collector 24 has a substantially ovular cross-sectional aspect from collector inlet 32 throughout intermediate section 36, and relatively rapidly transitions to a circular cross-sectional aspect near collector outlet 34.

The combined features of the alignment of outlet ends 28 of primary tubes 22 at collector 24 and the ovular cross-section of collector 24 at collector inlet 32 throughout intermediate section 36, with the transition to a circular cross-section proximate collector outlet 34, enables a uniform flow and avoidance of turbulence as exhaust gas 60 progresses through exhaust header system 20. In turn, the uniform flow of exhaust gas 60 reduces back pressure, maximizes horsepower and fuel efficiency, and extends the life span of the catalytic converter.

In summary, the present invention teaches of an exhaust header system for an internal combustion engine. The alignment of the outlet ends of each of the primary tubes at the collector inlet and the ovular transitioning to circular collector produces a uniform flow of exhaust gas to reduce back pressure, and maximize horsepower and fuel efficiency. In addition, the uniform flow of exhaust gas effectively extends the life span of the catalytic converter. Furthermore, the inclusion of a catalytic converter and uniform exhaust flow yields cleaner exhaust emissions while enhancing engine performance. Moreover, the direct bolt on installation and simple design results in a header system that is cost effective to manufacture and install.

Although the preferred embodiments of the invention have been illustrated and described in detail, it will be readily apparent to those skilled in the art that various modifications may be made therein without departing from the spirit of the invention or from the scope of the appended claims. For example, the present header system is not limited to three primary tubes. An alternative header system may include four primary tubes that converge in alignment at an ovular collector inlet of a collector.

What is claimed is:

1. An exhaust header system for an internal combustion engine comprising:

primary tubes, each having inlet and outlet ends, said inlet ends being adapted to carry exhaust gas from exhaust ports of said internal combustion engine; and a collector having a collector inlet for receiving said exhaust gas from said primary tubes and a collector outlet, said outlet ends of said primary tubes converging at said collector inlet, said collector inlet exhibiting an ovular cross-section, and said collector outlet exhibiting a circular cross-section.

2. An exhaust header system as claimed in claim 1 wherein said primary tubes comprise:

a first primary tube;

a second primary tube; and a third primary tube disposed between said first and second primary tubes, said third primary tube and said collector at said collector inlet being aligned along a common axis.

3. An exhaust header system as claimed in claim 2 wherein:

said second primary tube is oriented substantially perpendicular to said first primary tube to form an approximate right angle therebetween; and said third primary tube, disposed between said first and second primary tubes, subdivides said right angle into a pair of substantially equivalent acute angles.

4. An exhaust header system as claimed in claim 1 wherein each of said primary tubes exhibits a diameter, and a height of said collector inlet is substantially equivalent to said diameter.

5. An exhaust header system as claimed in claim 1 wherein said collector inlet exhibits a width and a height, said width being greater than said height, and said outlet ends of said primary tubes are substantially aligned along said width.

6. An exhaust header system as claimed in claim 1 wherein said collector inlet comprises:
   a first flat wall;
   a second flat wall in opposing relationship with said first flat wall;
   a first arcuate wall coupled to first ends of each of said first and second flat walls; and
   a second arcuate wall coupled to second ends of said each of said first and second flat walls, said first and second flat walls being longer than said first and second arcuate walls.

7. An exhaust header system as claimed in claim 1 wherein said collector further includes an intermediate section juxtaposed between said collector inlet and said collector outlet for carrying said exhaust gas from said collector inlet to said collector outlet, said intermediate section exhibiting a cross-section that transitions from said ovular cross-section to said circular cross-section proximate said collector outlet.

8. An exhaust header system as claimed in claim 7 wherein:
   said ovular cross-section of said collector inlet exhibits a first width; and
   said intermediate section exhibits a section width, said section width tapering from said first width at said collector inlet to a second width at said collector outlet, said second width defining a diameter of said circular cross-section, and said diameter being less than said first width.

9. An exhaust header system as claimed in claim 7 wherein said ovular cross-section of said collector inlet exhibits a height, said circular cross-section exhibits a diameter, said diameter being greater than said height, and a section height of said intermediate section transitions from said height to said diameter proximate said collector outlet.

10. An exhaust header system as claimed in claim 1 further comprising a heater box enclosing said primary tubes and said collector inlet of said collector, said heater box including an air inlet and an air outlet, wherein cool air is drawn into said heater box via said air inlet, and heat, radiated from said primary tubes, warms said cool air to form warm air, said warm air being released from said air outlet.

11. An exhaust header system as claimed in claim 1 further comprising a catalytic converter coupled to said collector outlet of said collector.

12. An exhaust header system as claimed in claim 1 wherein said exhaust ports includes a first set of exhaust ports and a second set of exhaust ports, said primary tubes being adapted to carry exhaust gas from said first set of exhaust ports, and said system further comprises:
   second primary tubes, each having second inlet and second outlet ends, said second inlet ends being adapted to carry exhaust gas from said second set of exhaust ports; and
   a second collector having a second collector inlet and a second collector outlet, said second outlet ends of said second primary tubes converging at said second collector inlet for receiving said exhaust gas from said second primary tubes, said second collector inlet exhibiting said ovular cross-section and said second collector outlet exhibiting said circular cross-section.

13. An exhaust header system for an internal combustion engine comprising:
   primary tubes, each having inlet and outlet ends, said inlet ends being adapted to carry exhaust gas from exhaust ports of said internal combustion engine; and
   a collector including:
      a collector inlet for receiving said exhaust gas from said primary tubes, said collector inlet exhibiting an ovular cross-section defined by a width and a height, said width being greater than said height, and said outlet ends of said primary tubes being aligned along said width;
      a collector outlet exhibiting a circular cross-section; and
      an intermediate section juxtaposed between said collector inlet and said collector outlet for carrying said exhaust gas from said collector inlet to said collector outlet, said intermediate section exhibiting a cross-section that transitions from said ovular cross-section to said circular cross-section proximate said collector outlet.

14. An exhaust header system as claimed in claim 13 wherein said primary tubes comprise:
   a first primary tube;
   a second primary tube; and
   a third primary tube disposed between said first and second primary tubes, a first center point of said third primary tube being aligned with a second center point of said collector inlet.

15. An exhaust header system as claimed in claim 13 wherein each of said primary tubes exhibits a diameter, and said height of said collector inlet is substantially equivalent to said diameter.

16. An exhaust header system as claimed in claim 13 wherein said collector inlet comprises:
   a first flat wall;
   a second flat wall in opposing relationship with said first flat wall;
   a first arcuate wall coupled to first ends of each of said first and second flat walls; and
   a second arcuate wall coupled to second ends of said each of said first and second flat walls, said first and second flat walls being longer than said first and second arcuate walls.

17. An exhaust header system as claimed in claim 13 wherein said width of said ovular cross-section is a first width and said intermediate section exhibits a section width, said section width tapering from said first width at said collector inlet to a second width at said collector outlet, said second width defining a diameter of said circular cross-section, and said diameter being less than said first width.

18. An exhaust header system as claimed in claim 13 wherein said circular cross-section of said collector outlet exhibits a diameter, said diameter being greater than said height of said ovular cross-section at collector inlet, and a section height of said intermediate section transitions from said height to said diameter proximate said collector outlet.

19. An exhaust header system for an internal combustion engine comprising:
   primary tubes, each having inlet and outlet ends, said inlet ends being adapted to carry exhaust gas from exhaust ports of said internal combustion engine;
   a collector having a collector inlet for receiving said exhaust gas from said primary tubes and a collector outlet, said outlet ends of said primary tubes converging at said collector inlet, said collector inlet exhibiting an ovular cross-section, and said collector outlet exhibiting a circular cross-section;

a catalytic converter coupled to said collector outlet of said collector; and a heater box enclosing said primary tubes and said collector inlet of said collector, said heater box including an air inlet and an air outlet, wherein cool air is drawn into said heater box via said-air inlet, and heat radiated from said primary tubes warms said cool air to form warm air, said warm air being release released from said air outlet.

20. An exhaust header system as claimed in claim 19 wherein said collector inlet comprises:

a first flat wall;

a second flat wall in opposing relationship with said first flat wall;

a first arcuate wall coupled to first ends of each of said first and second flat walls; and a second arcuate wall coupled to second ends of said each of said first and second flat walls, said first and second flat walls being longer than said first and second arcuate walls.

* * * * *